Dec. 15, 1942.   W. D. STEWART ET AL   2,304,858
PREPARATION OF CRUDE RUBBER
Filed Feb. 20, 1940
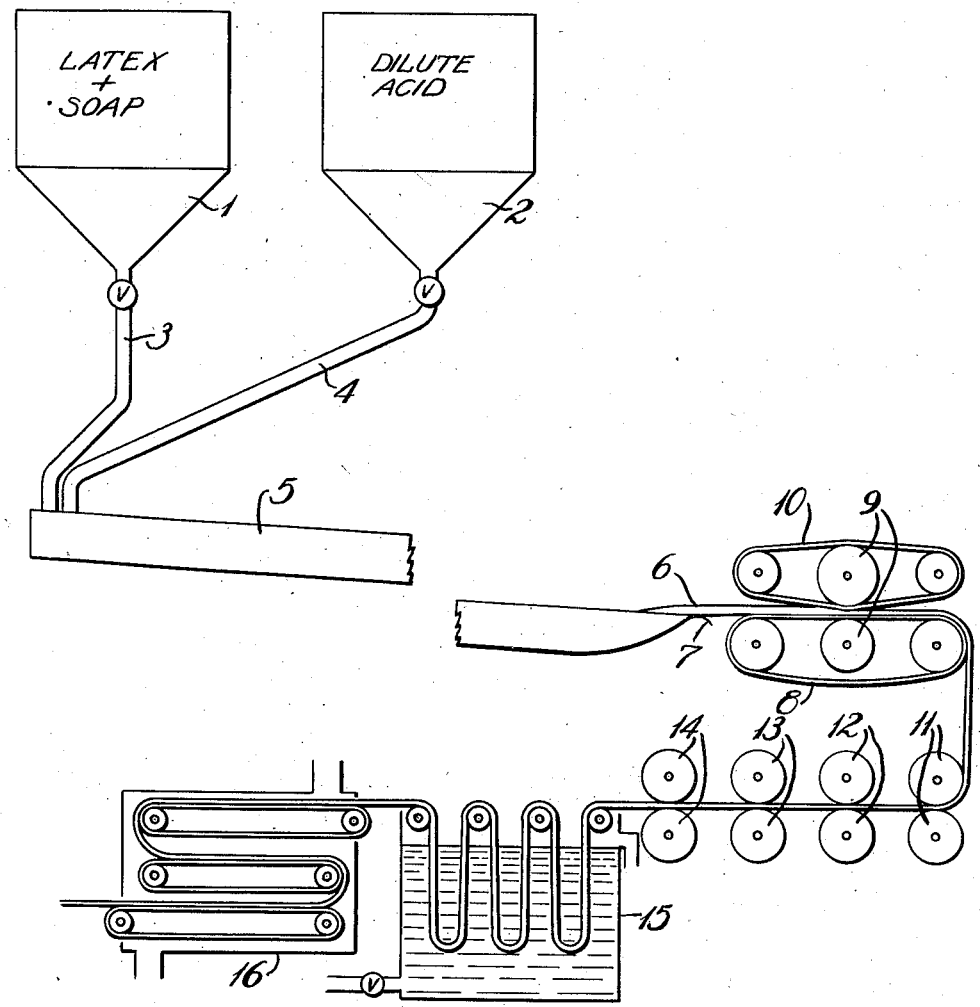
Inventors
William D. Stewart
Edwin B. Newton
By Willis F. Avery
Atty.

Patented Dec. 15, 1942

2,304,858

UNITED STATES PATENT OFFICE 2,304,858

PREPARATION OF CRUDE RUBBER

William D. Stewart and Edwin B. Newton, Kuala Lumpur, Federated Malay States, assignors to The B. F. Goodrich Company, New York, N. Y., a corporation of New York Application February 20, 1940, Serial No. 319,905
In Great Britain April 14, 1939

8 Claims. (Cl. 18—57)

This invention relates to the preparation of crude rubber from the latex of the common rubber tree, Hevea brasiliensis.

Heretofore practically all the crude rubber prepared on rubber plantations has been prepared by mixing the latex, either as it comes from the tree or after dilution to standard rubber content, with dilute acid such as acetic or formic acid, and allowing to stand for several hours in suitable pans or tanks until a firm coagulum is produced. The coagulum is then worked up either into sheet rubber, by pressing lightly between rollers and hanging up to dry in a smoke house; or into crepe rubber, by pressing firmly between closely spaced rollers over which water flows, and drying in air. Such manipulation involves a great deal of labor in the individual handling of the fractions of liquid deposited in each coagulating tank, of the coagulum to and through the various rolls employed, and of the wet sheet or crepe to and in the drying houses; and partly because of unavoidable differences in the manner in which different portions of the output are handled and in the conditions to which they are subjected in coagulation, sheeting and drying, the finished crude rubber is variable in its properties, particularly in rate of vulcanization.

In accordance with this invention crude rubber is made from the latex of Hevea brasiliensis by continuously mixing the latex with a coagulant to form a continuous ribbon of coagulum, which may then be continuously pressed, washed, dried, or otherwise treated to prepare the desired grade of crude rubber. The coagulation of the latex with acid, unless uneconomically large quantities of acid are used, requires a time which is longer than is convenient for a continuous process, hence it is preferred to add to the latex a coalescence-accelerator which causes it to set up to a firm coagulum very quickly after the addition of the acid.

The coalescence-accelerators which may be used include the soluble salts of soap-forming fatty acids as well as of other organic acids which are almost insoluble in water but which form soluble salts, such as benzoic acid and certain phenols. It is known that latex which has been sterilized by pouring into boiling water (sometimes called B-liquid) and which is incapable of forming coherent coagula when acidified, can be induced to coalesce to a coherent coagulum by the addition of such materials; but it has not been known that they have any material effect on the properties of fresh latex.

The addition of a small proportion of one of the aforementioned coalescence-accelerators to fresh latex reduces the time required for the formation of a coherent coagulum from hours to minutes or even seconds. For example, fresh latex when mixed with fourteen times its volume of water containing about 0.033% acetic acid required almost an hour to form a coherent coagulum, while the same latex, if a solution of hard soap (largely sodium stearate) is first added in a proportion equivalent to 1% of stearic acid based on the dry rubber content of the latex, under the same conditions starts to coalesce in about one minute and forms a coherent coagulum in about two minutes.

Similar results are secured with other coalescence-accelerators of the type set forth above. Sodium soaps are at present preferred because of their availability at low cost and because they do not appear to introduce extraneous ingredients into the rubber. Other soluble soaps such as ammonium or potassium soaps may be substituted if desired. It is not even necessary that the soap be separated from the glycerine formed in the usual saponification process, for crude soap solution made by heating natural fats or fatty oils with alkali solution give good results and may be prepared at low cost from raw materials produced in the rubber growing countries themselves. The soaps of lauric, stearic, palmitic, oleic or other soap-forming fatty acids or the usual mixtures thereof may be used. Furthermore, phenols such as beta-naphthol or p-nitrophenol give excellent results when added to the latex as solutions of their sodium salts.

The proportions of coalescence-accelerator may be varied over a considerable range. Even 0.1% based on the rubber content of the latex markedly accelerates coalescence, but larger proportions such as the 1% mentioned above act much more rapidly and greater acceleration can be achieved by still further increasing the amount used.

The quantity of coagulant required will depend on the nature of the coagulant, the dilution of the latex, and on the quantity and buffering effect of the coalescence-accelerator, acidification to a pH of about 5 or lower, preferably in the neighborhood of 4.5 to 4.8, being advisable for rapid and complete coagulation. Acidification to a lower pH value, although it requires somewhat more acid, further accelerates coalescence. Raising the temperature likewise accelerates coalescence somewhat. Any of the usual acid coagulants may be employed, the organic acids such as formic, acetic, lactic and citric acids being preferred, although mineral acids such as sulfuric acid may be employed if desired, or even acid salts such as alum, sodium bisulfate, or salts of polyvalent metals such as calcium or magnesium chloride or acetate.

Coalescence may be still further accelerated by the addition of suitable electrolytes. At an acidity corresponding to pH about 4.5 the relative effectiveness of the common electrolytes is represented approximately by the following lyotropic series:

(Most effective)

| chloride | magnesium |
| thiocyanate | calcium |
| nitrate | barium |
| phosphate | zinc |
| acetate | lead |
| ferrocyanide | potassium |

(Least effective)

The electrolytes may be employed either in the presence or absence of coalescence-accelerators. If they are used, they should obviously be compounds which liberate ions near the head of the series. Calcium chloride is extremely effective, inexpensive and readily available. In general, soluble salts of polyvalent metals are effective.

As an example of the effect of a suitable electrolyte, when fresh latex is coagulated with acetic acid solution containing a quantity of calcium chloride corresponding to ¼% of calcium chloride based on the rubber content of the latex, the time required for the formation of a coherent coagulum is only half that required for coagulation by acid alone, while with 1% of calcium chloride, the time required is only a quarter of that for acid alone. If a coalescence-accelerator is present, the two agents reinforce each other. Thus the coagulation time at pH about 4.8 in the presence of 1% fatty acid added to the latex as soap solution is about a fortieth of that of untreated latex, but in the presence of both 1% fatty acid in the latex and 1% calcium chloride in the coagulant (both based on the rubber) it is only about a hundred-twentieth, the actual time being only a fraction of a minute.

The order of admixture of these materials is subject to some variation. For instance, when a coalescence-accelerator is used, it may be added to the latex after the coagulant; and if an electrolyte is used it may be added to the latex separately from the acid, but the most rapid and uniform coagulation is secured by adding the solution of coalescence-accelerator to the latex (which materially dilutes the latex), and dissolving the coagulant and electrolyte (if used) in the remaining dilution water, and then mixing these two liquids.

The latex may be coagulated at about the concentration at which it is obtained from the tree, but a considerable dilution, either of the latex directly or by means of the solution of the coalescence-accelerator or of the coagulant, contributes greatly to ease and completeness of mixing. This is particularly important in the process of this invention because of the rapidity with which coalescence sets in when coalescence-accelerators are used. Thus, the coalescence-accelerator may be dissolved in a volume of water half that of the latex to be treated, and mixed with the latex, and the acid may be mixed with a further quantity of water equal in volume to the latex thus diluted. A mixture of equal volumes of these liquids then brings about coagulation at a concentration of about 10 to 12% rubber.

As is pointed out in a companion specification, crude rubber having a very low water absorptive capacity may be obtained by coagulating extremely dilute latex, removing the serum from the coagulum and heating the wet coagulum to a temperature over 75° C. and preferably 90° C. or higher. The process of this invention is very readily carried out under these conditions to give a water resistant rubber, as will be evident from the examples given below. In these examples the coagulation is brought about by acid alone, but it will be evident that similar results can be obtained with acid together with the electrolyte, as set forth above. It may be preferred to omit the electrolyte in case a product of minimum water absorption is desired.

The full advantages of this invention can be secured only by use of fresh latex, within a few hours of its collection. The storage of latex not only involves additional expense but requires the addition of preservatives which profoundly alter the properties of the latex. Thus ammonia in the proportions required for preservation changes the responsiveness of latex to the preferred coalescence-accelerators. Formaldehyde renders coalescence-accelerators less effective when used in proportions sufficient to preserve the fluidity of the latex for a considerable time, although a small proportion of formaldehyde amounting to not over 0.1% on the latex and capable of preserving the latex only for a day or two does not have a great effect. Caustic soda has less effect and may be used if it is necessary to preserve the latex for a time before it is coagulated, but even with this preservative the minimum quantity requisite for the desired effect should be used, say 0.2% of the latex. Nevertheless, preserved latex may be employed if proper account is taken of the different length of time required for its coagulation, particularly if the coagulation is hastened by concurrent use of suitable electrolytes, for soluble salts of polyvalent metals, when added to the coagulant, greatly accelerate the coagulation of either fresh or preserved latex. This modification is particularly advantageous in the working up of the skim fraction of centrifugally concentrated latex or creamed latex.

As a specific example of one embodiment of the invention, an apparatus similar to that shown diagrammatically in the accompanying drawing may be used. Fresh Hevea latex in the tank 1 is mixed with a soap solution containing a quantity of soap equivalent to 1% of fatty acid based on the dry rubber content of the latex, and the mixture is diluted to 4% dry rubber content. A volume of water equal to that of the diluted latex is placed in tank 2 and mixed with sufficient acetic acid to produce a 0.066% solution. The contents of the respective tanks are then withdrawn at the same rate through conduits 3 and 4 and introduced into the upper end of a long, slightly inclined trough 5, preferably about sixty feet long and of such inclination that the latex requires two minutes to flow to the lower end. The continuous flow of the two fluids from adjacent outlets into the trough ordinarily brings about adequate mixing, but if desired baffles or other mixing devices may be used. The trough should be of a material to which the coagulum does not readily adhere, and should preferably be maintained wet further to reduce the possibility of adhesion. A porous material such as Portland cement concrete or wood will maintain itself sufficiently wet above the surface of the latex by capillary action, but this effect may be supplemented or replaced by fine sprays of water or by covering the trough to retard drying. Zinc metal is a very satisfactory material if care is taken to keep it well wet, but aluminum shows an undesirable tendency to adhere to the coagulum. The mixture of latex and acid has a dry rubber content of 2%, and sets up as it flows down the trough. By the time it reaches the lower end it has coalesced to a continuous strip of coagulum having the same cross-sectional shape as the trough, and has begun to synerize, but because of its extremely low rubber content it is very soft and tender. The strip of coagulum 6 is floated over an overflow lip 7 at the lower end of the trough and passes to a pervious belt 8 which carries it between a pair of squeeze rolls 9. Another pervious belt 10 is run on the upper surface of the coagulum as it traverses the squeeze rolls to assist in the expression of serum from the coagulum and to prevent undue distortion during this operation. This preliminary squeezing compacts and strengthens the coagulum sufficiently to permit its passage directly through a battery of sheeting rolls 11, 12, 13, 14, which further compact it and express most of the remaining serum. The coagulum is then immersed in continuously renewed water at a temperature of about 90° C. in a tank 15 for about five minutes, then is dried, preferably in a continuous forced draft drier 16.

The product is a light colored, translucent, continuous sheet of rubber indistinguishable in most of its properties (other than its obvious difference in shape) from first latex crepe. It has a nitrogen content of about 0.3% and a normal rate of vulcanization and rate of aging. It differs from the present standard grades of rubber in having an extremely low water absorptive capacity comparable to the best "deproteinized" rubber, and freedom from mold, mildew or other blemishes, as well as a more rapid rate of breakdown on mastication. It may be cut up into sheets for baling or crating or may be rolled into cylindrical rolls as may be preferred.

The process may be carried out in other manners than that specifically described above. For example, the latex and acid may be diluted only sufficiently to give a coagulum of 10% dry rubber instead of 2% as above, but in this case the same extremely low water absorptive capacity will not be attained. The coalescence-accelerator may be omitted, but the trough will then have to be greatly lengthened because of the longer time required for complete coagulation.

Other coalescence-accelerators may likewise be employed with similar results. For example, the sodium salt of beta-naphthol gives the same rapid coalescence as soap when used in the same proportion.

If desired, a part or all of the process may be carried out discontinuously. Thus the strip of coagulum from the trough may be cut into sheets which may be individually sheeted and dried, or the mixture of latex, coalescence-accelerator and acid may be poured into pans or tanks to produce individual sheets of coagulum which may be worked up in the conventional manner. These modifications have the advantage that the extremely rapid coalescence permits the coagulating tanks or pans to be used over and over on the same day.

We claim:

1. The method of preparing crude rubber which comprises mixing Hevea latex with a coalescence-accelerator which is a soluble salt of an organic acid substantially insoluble in water, and continuously intermixing a stream of the treated latex with a stream of dilute acid coagulant sufficient to bring the mixture to pH not over about 5 to produce a continuous strip of coagulum.

2. The method of claim 1 in which the mixture passes along a shaped conduit to produce a shaped continuous strip of coagulum.

3. The method of claim 1 in which the coagulum is continuously pressed and dried.

4. The method of claim 1 in which the final mixture is extremely dilute so that the strip of coagulum has a low rubber content, and the strip is continuously pressed, washed in fresh water at a temperature of at least 75° C. and dried.

5. The method of claim 1 in which the coalescence-accelerator is soap.

6. The method of preparing crude rubber which comprises mixing fresh Hevea latex with a soluble soap and promptly intermixing a continuous stream of the treated latex with a continuous stream of dilute acid coagulant sufficient to bring the mixture to pH not over about 5 to produce a continuous strip of coagulum.

7. The method of preparing crude rubber which comprises mixing fresh Hevea latex with a soluble soap and promptly intermixing a continuous stream of the treated latex with a continuous stream of dilute acid coagulant containing a soluble salt of a polyvalent metal, the volumes of the streams being such as to bring the mixture to pH not over about 5, and passing the mixture along a shaped conduit to produce a shaped continuous strip of coagulum.

8. The method of preparing crude rubber which comprises mixing fresh Hevea latex with a soluble soap and promptly intermixing a continuous stream of the treated latex with a continuous stream of dilute acid coagulant, the volumes and dilutions of the streams being such as to produce an extremely dilute mixture of pH not over about 5, passing the mixture along a shaped conduit to produce a shaped continuous strip of coagulum of low rubber content, continuously pressing the strip, washing it in fresh water at a temperature of at least 75° C. and drying it.

WILLIAM D. STEWART.
EDWIN B. NEWTON.